United States Patent Office 3,326,355
Patented June 20, 1967

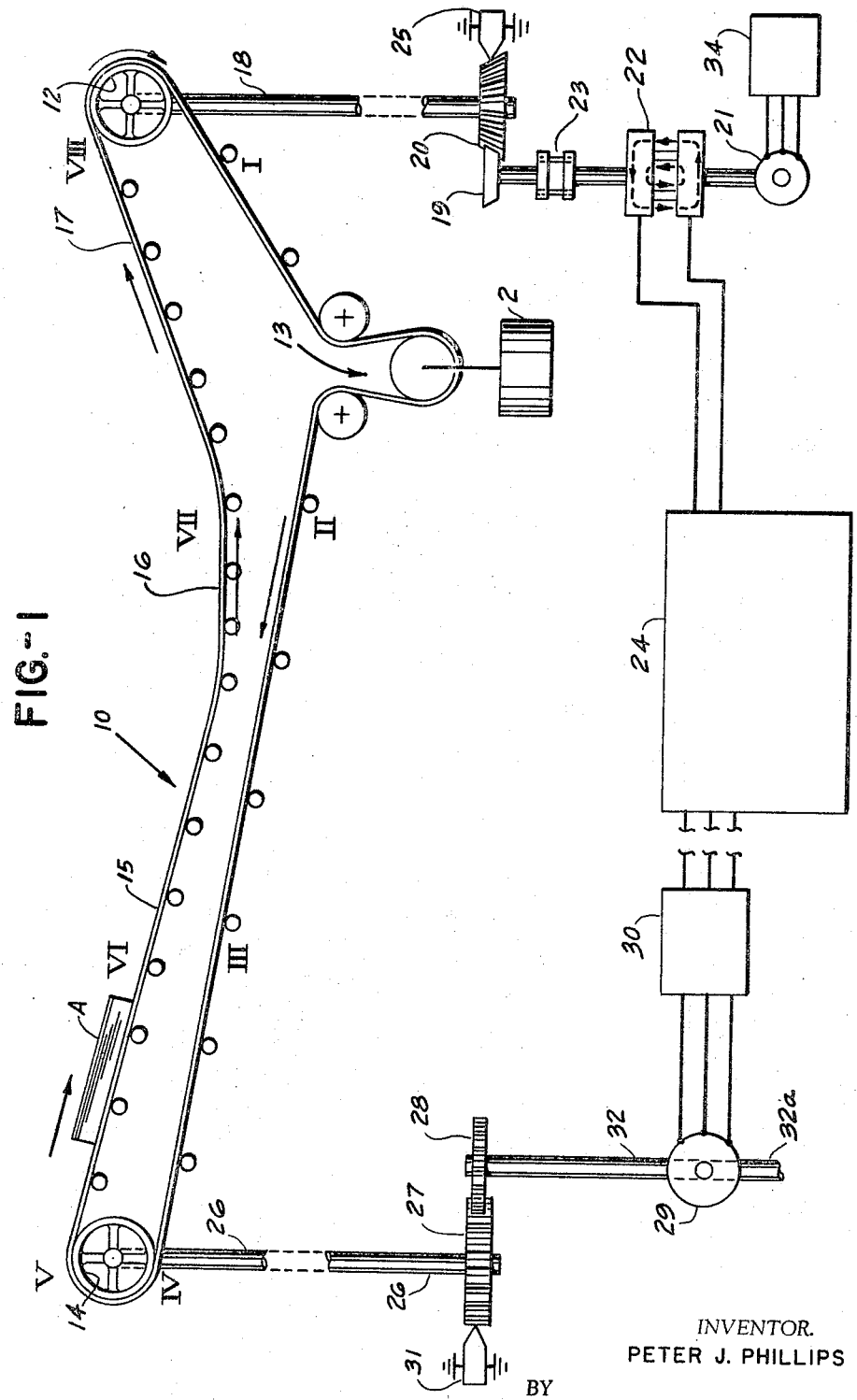

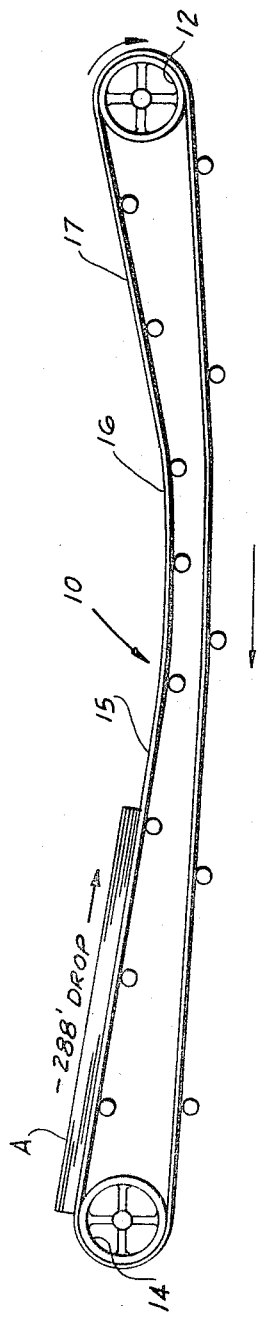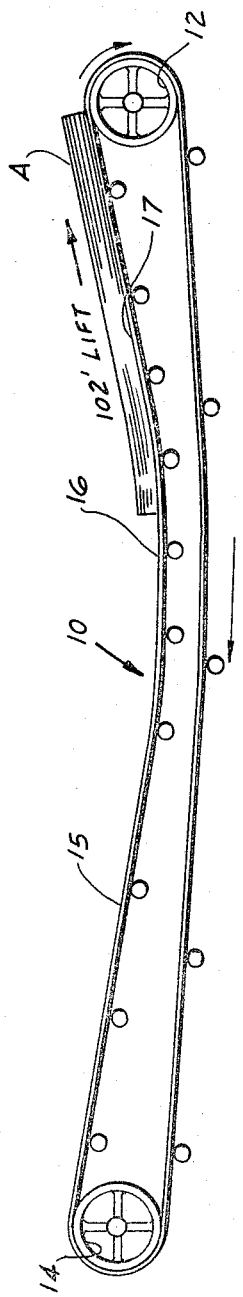

3,326,355
CONVEYOR SYSTEM
Peter J. Phillips, Glen Rock, N.J., assignor to Hewitt-Robins Incorporated, Stamford, Conn.
Filed Feb. 8, 1965, Ser. No. 430,859
3 Claims. (Cl. 198—203)

This invention relates to material carrying belt conveyors. It relates particularly to belt conveyors of the compound type employed in the handling of bulk materials. However, it is also useful for conveyors having a simple profile. Broadly speaking, this invention provides a means for controlling and adjusting the tension on the top or load-carrying sections of the conveyor belt.

A compound type of conveyor is one wherein the load-carrying run of the belt has a profile which may include any combination of inclines, declines, and horizontal sections. By profile is meant the slope of the load-carrying run of the belt conveyor. A simple conveyor is one whose profile is a straight line at any inclination. A conveyor having only one change in slope such as a horizontal section followed by an incline or decline run of belt is often still characterized as a simple conveyor, i.e., a conveyor having a simple profile. This is also true of a conveyor having an inclined section followed by a horizontal run of belt. However, a conveyor whose profile starts with a decline section and then is followed by a horizontal section is considered to be of the compound type.

Belt conveyors for handling bulk materials very commonly utilize a continuous, flexible, load-carrying member, i.e., a belt, often made of fabric having a rubber covering on the top and bottom surfaces thereof. Such a belt is supported on rollers, called idlers. These idlers are spaced at intervals of one or more feet apart. Due to the flexibility of the belt and its method of support, the belt has a tendency to sag between its supporting idlers. It has been observed that, (1) The degree of sag is a function of idler spacing, load on the belt, and belt tension; and (2) The successful containment and movement of the materials being handled by the belt is dependent upon adequate tension in the belt to prevent sag, and loss of tension will cause excessive sag and spillage of the material.

With conveyors of the compound type, the belt tension on the top or material carrying strand varies and is influenced by the amount of load on the belt and the position of the load along the belt profile. Belt tensions will increase along an inclined section and will decrease along a decline section, as compared to those along a horizontal section in the same conveyor.

One method presently used to insure adequate tension in a compound conveyor, or simple conveyor of long length, is to employ a sufficiently heavy counterweight so that decreasing belt tensions caused by descending loads do not approach or exceed critically low levels where lateral spillage may occur. The use of such counterweights is an effective means of resolving low belt tension problems, however, they introduce a fixed and unalterable tension component into the conveying system resulting in an enforced initial selection of a stronger, and, therefore, costlier belt. Furthermore, the pulleys, shafts, bearings and supports must be designed for the high loading traceable to the heavy counterweight inserted into the system, which loading is actually only needed for the maximum, most difficult condition of the conveyor operation.

An alternate approach frequently employed by conveyor engineers is the splitting of a compound conveyor into several simple conveyors. This technique, though an effective solution to the belt tension problem, involves more machinery as well as more complex machinery. The added initial costs and subsequent maintenance expenses attending the use of many separate conveyors, and the coordination problems imposed by the use of several separate conveyors, are not desired and are best avoided, if possible. The creation of additional transfer points is particularly objectionable when handling certain materials because of increased degradation of material size.

Accordingly, it is an object of this invention to provide long-length, flexible belt conveyor systems, having variable profiles along their length, in which the belt tensions will be maintained without the use of excessive counterweights and heavier belts and without the use of separate conveyors.

A further object is to provide means for maintaining adequate tension in the belt at all times without subjecting the conveyor belt to a fixed maximum tension at all times.

Another object of this invention is to provide a means of adjusting belt tensions on a load-carrying strand continuously, automatically, adequately and in accordance with the need of belt conveyor systems, without the application of excessive belt tension.

The continuous automatic maintenance of adequate, but not excessive, variable belt tension is effected, according to this invention, by providing drives for the belt which will respond, automatically, to the variable loadings and speeds of operation of the conveyor, whereby the drives vary their effect upon the belt, i.e., the amount of force applied to the belt either in pulling and/or retarding, and thereby vary the total tension on the top or carrying strand of the belt in accordance with the said variable loadings and speeds.

Belt conveyors in accordance with this invention avoid, in a large measure, the dependence upon heavy counterweights as the means of developing adequate belt tensions. The practice of this invention permits the selection of a counterweight specifically, and solely, for the purpose of providing sufficient slack side tension for the tractive effort of the drive pulleys. This results in an overall lower level of belt tensions in the system, and, ultimately, makes possible the use of more economical belt and machinery selections.

These and other objects and advantages will become more apparent after consideration of the following description and the accompanying drawings wherein:

FIGURE 1 is a simplified elevational view of a compound conveyor adapted to be driven in accordance with this invention;

FIGURE 2 is a schematic view of the flexible conveyor belt of the conveyor of FIGURE 1 showing a load applied to a portion thereof;

FIGURE 3 is another schematic view of the flexible conveyor belt of the conveyor of FIGURE 1 showing a load thereon in a different position from that illustrated in FIGURE 2;

Figure 4:
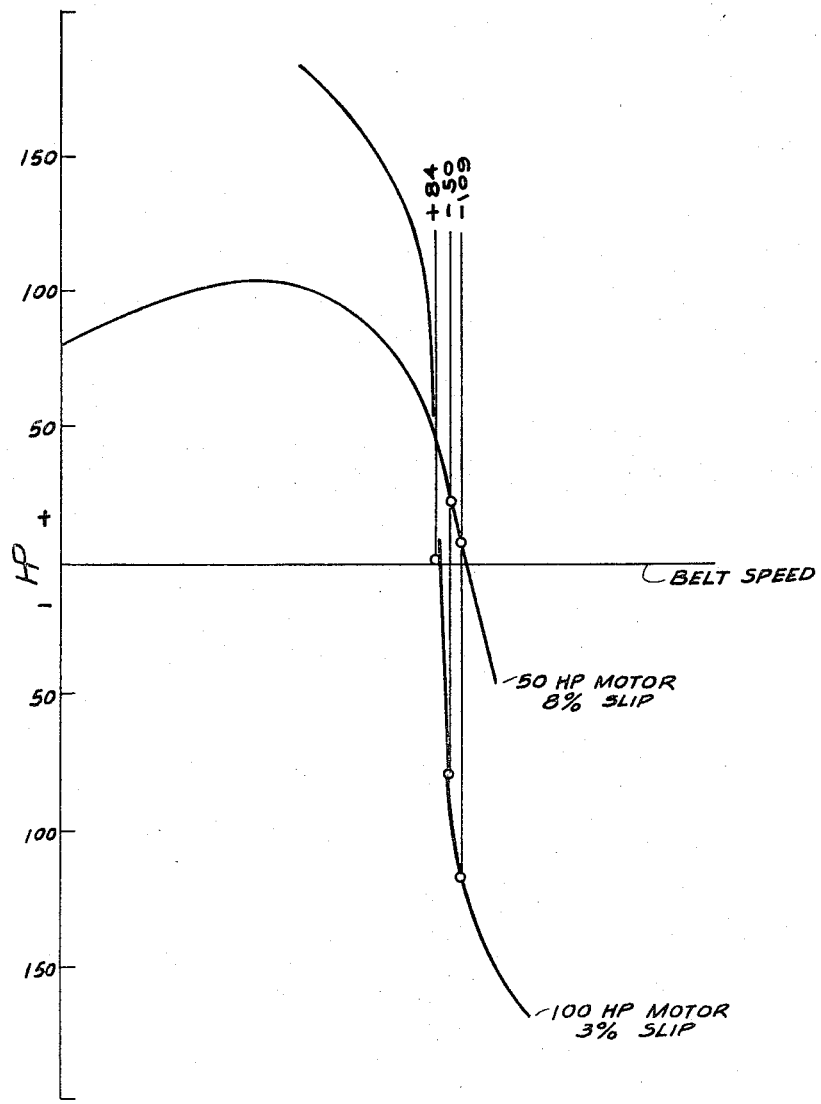
FIGURE 4 is a graphical representation of the characteristics of the drives employed at the head and tail of the conveyor of FIGURE 1.

A moving conveyor requires power to overcome frictional and belt resistance as it passes over the supporting idlers. The degree of this resistive effort increases proportionally with increasing material load. This is true for any section of conveyor regardless of its profile characteristics. The net tractive effort is further influenced by the profile along which the load may be moving. When the material load is moving up an incline, additional power must be supplied to lift the load. If the material load is moving on a decline, that component of the gravity force parallel with the direction of travel is opposite to the resistive forces of the system and aids in the movement of the conveyor belt. The magnitude of this accelerating gravity force may be greater than the total frictional resistance forces of the system. In such an instance, means for absorbing the excess potential energy of the descending load must be provided.

Typical conveyor belt tension behavior may be briefly illustrated by reference to FIGURE 1 of the drawings, wherein the top or material carrying strand moves from left to right and the bottom or return strand moves from right to left. A counterweight 2 is provided to act directly on the return strand of the belt, and is free to move up or down automatically without any restriction. This provides for adjustment to changed belt lengths due to stretch or contraction caused by varying belt tensions. Tension changes are caused by friction in moving parts and belt resistance as it flexes over the supporting rollers. For simplicity, we can refer to these forces generally as friction.

The tension at point I remains constant and is a function of the selected counterweight. The belt in traversing from point I to point II has its tension increased by the amount of friction to be overcome. However, in this instance, there is a concurrent loss of tension due to its descent to lower elevation, which is called belt drop. The tension at II, therefore, is the tension at I plus friction, minus belt drop. In proceeding to point III, the tension is increased due to friction only. At point IV, the tension further increases by the amount of friction and also as a result of the new and higher elevation, called belt lift. A similar analysis is effective in proceeding from points V–VIII. On any empty conveyor, the belt lift and belt drop values for the two runs of the belt would cancel out, because the belt is of a continuous length. The total tension difference between points VIII and I would be, therefore, the sum of the friction. Therefore, the drive means at VIII–I delivers this tractive effort when the conveyor is running.

If the load-carrying or top strand, however, is loaded with the material to be moved, as illustrated in FIGURE 1, the tension change from V to VI would increase by the increased amount of friction to be overcome, and also decrease due to the descending load on the belt, called belt and load drop. The significance of these values, insofar as tension variations due to changes in elevation are concerned, can be recognized readily on comparing the effect of the descending load and friction.

The descending load effect is equal to the product of the weight on one linear foot of conveyor belt and the number of feet of change in elevation. On the other hand, the friction for a similar length of belt section will seldom exceed 10% of the elevation change on a 15° slope, such as illustrated. Thus, the effect of the load as an accelerating force is much greater than its effect as a friction creating force.

On the conveyor shown in FIGURE 1, the net force developed on the decline section, indicated by points V–VI, can be greater than the tension at point IV if the counterweight were selected solely for the purpose of developing sufficient tractive effort at the head drive. In such an instance, this force of the decline loaded section will overwhelm and lift the counterweight, thereby serving to introduce excess belt into the top strand. This will result in loss of tension and material spillage will quite likely occur along the lower portion of the sloped section VI. This would occur wherever the decline section V–VI is loaded, regardless of any other load forward of point VI. The instant invention provides means for maintaining proper tension and preventing overwhelming of the counterweight, and the resulting introduction of excess belt into the top strand, while using a counterweight of sufficient size as would only prevent slippage at the drive pulley.

In the form of the invention illustrated in FIGURES 1–5, the drives comprise electric motors. One motor is located at or near the head or discharge end of the conveyor, and a second motor is located at or near the tail end. According to the invention, one of the drives, i.e., the motor and its connection to the belt, must be of a nature such that its torque output (or horsepower) varies with the speed at which the belt is running. That is, torque delivery of the drive must change as belt speed changes. It is known that the torque delivery of electrical motors will vary in accordance with their speed. This behavior is described as the slip-torque characteristics of the motor.

It has been found that by selecting electric drive motors of known predetermined behavior characteristics, the operation of conveyors can be effectively controlled regardless of the nature of the loads placed upon them, or the nature of their profiles.

Other devices may be used with the motor to change or control the degree of slip of the complete drive. These can include such instruments as fluid couplings, eddy current couplings, hydraulic pumps used either singularly or with a prime mover such as an electric motor, and electrical voltage and/or cycle variators.

One factor of significance in the use of motors is that belt speeds are presently usually limited to below approximately 1,000 feet per minute in the United States of America. Conceivably, in the future, speeds up to 2,000 feet per minute, or more, may be developed. In any case, due to the high rotating speed of the motors usually used (i.e., 750, 900, 1200 or 1800 r.p.m.), at synchronous speed, belt conveyors generally require a gear reduction to obtain the desired rotation of drive pulleys. The gear reduction also results in a mechanical advantage in converting motor torque to the traction effort between drive pulley and conveyor belt.

According to this invention, the head and tail drives are selected to produce a purposeful and exact relationship between them in association with the conveyor belt which serves to interconnect and couple the drives to each other. Gear ratios and drive pulley diameters are chosen to produce an exact displacement between, or ratio between, the electric head and tail drive motors which, as stated above, are selected for certain predetermined behavior characteristics.

The arrangement is designed for each conveyor to exactly fit its needs, and, particularly, having regard to the amount of tension desired and the total variation in tension control needed. The latter is usually a function of the conveyor profile change.

The motors used in this invention may be of any number of standard types, such as squirrel cage induction, wound rotor, or direct current motors. Such motors are said to have a "synchronous" speed or r.p.m. At this r.p.m., the motor delivers zero torque. If a resisting load were placed on the motor shaft, it will cause the motor speed to decrease. With decreasing speed, the motor will deliver increasing torque. Each motor has a full load rating, which is specified usually in terms of horsepower, torque or kilowatt rating. For example, a 5 horsepower (HP), 1800 r.p.m. squirrel cage induction motor of the NEMA "B" type will have a synchronous speed of 1800 r.p.m. Its full load speed will be something on the order of 1770 r.p.m., at which speed it is developing the rated (5) HP. If the motor were of the NEMA "D" type, its slip at rated load will be much larger. It may require a slip to about 1666 r.p.m. (13% slip) before rated torque is developed.

In the above illustration, the motor is converting electrical energy into mechanical energy in the form of a torque at its output shaft rotating at a specific r.p.m. However, it is possible by mechanical means to force motor rotation above its synchronous r.p.m. When this happens, the motor becomes an alternator-generator and converts mechanical energy into electrical energy which may be "pumped" back into the power system. The amount of this energy is often referred to as generated horsepower. For example, the NEMA "B" motor described above which developed 5 HP when it slipped back 30 r.p.m. from 1800 to 1770, will generate electricity back into the power line in the amount equivalent to 5 HP if it were made to rotate at about 30 r.p.m. above its synchronous speed, or 1830 r.p.m.

To illustrate the use of motors, which may be used together with other revolution slip variators according to this invention, consider the effect of two identical 5 HP motors, each having mounted on its shaft diametrically identical V-belt sheaves The two sheaves are joined by an endless V-belt. When both motors are energized, neglecting obvious efficiency losses, both motors will be running at "no load," since their synchronous speeds are exactly in phase with each other. If now one of the V-belt sheaves were to be replaced by one whose diameter is, for example, 6% larger than the original, when both motors are energized, again neglecting efficiency losses, the motor with the larger sheave will force the motor with the smaller sheave to rotate above its synchronous speed. What occurs is that the motor with the larger sheave will slow down or slip back by 3% below synchronous speed, and the motor with smaller sheave will speed up by about 3% above its synchronous speed. The latter will now be running as a generator. If 3% was the slip to full load rating, power readings taken at both motors would show that one motor is driving or pulling at the rate of 5 HP, and the second is generating at the same rate. The sum of the efforts by both motors, neglecting friction, is zero, similar to the case when identical sheaves were employed. These motors are characterized by their tendency to return to synchronous speed, external load permitting.

As a further illustration of operating with two sheaves having different diameters, assume that by some mechanical means acting on the V-belt, the belt is slowed down. For example, this can be done by having something rub against the V-belt. Then, both motors would slow down. The motor with the larger sheave will now slip back 4% and will be pulling at the rate of say 6 HP. The second motor, which had been previously generating at the rate of 5 HP, has also slowed down to say 2% above synchronous speed and may now be generating only 4 HP. Now the difference of plus 6 and minus 4 results in a net of plus 2 HP, which is the value of the resistive effort of the friction device acting on the V-belt.

The invention will now be described with reference to the accompanying drawings.

In FIGURE 1, there is shown a belt conveyor having a continuous flexible belt, designated generally at 10. The belt passes over a head and drive pulley 12 through a counterweight section 13 and over a tail pulley 14. Tail pulley 14 is also a drive pulley. The belt, it should be noted, has a downhill section 15, a horizontal section 16 and an uphill section 17. The belt 10 is shown as having a load, designated A, near the tail end of the conveyor on the downhill section 15.

The head end pulley 12 is driven by a shaft 18. The latter is, in turn, driven through gears 19, 20 by a motor 21. Suitable couplings such as an eddy current coupling 22 and a shear pin coupling 23 are interposed between the motor and the gears 19, 20. The purpose of the eddy current coupling is to provide means for varying the relationship between the motor 21 and the moving belt 10, if desired. A control 24 is provided for this purpose. It will be well understood by those skilled in the art that other suitable forms of couplings can be employed and it is not necessary to employ variable slip coupling devices such as 22. A brake 25 is provided to engage the drive in the event of failure of power, or, as desired, by the conveyor operator. It will be well-known to those skilled in the art that many types of brakes can be employed.

The tail end pulley 14 is also provided with a drive shaft 26. A gear set 27, 28 connects the drive shaft 26 to a motor 29. A brake 31 may also be provided, similar to brake 25.

Each of the motors is provided with controllers illustrated only diagrammatically at 30 and 34. The motor 29 may also be provided with a brake associated with it. This brake may be any one of the known types, and may suitably be arranged to act against a shoe (not shown) located on extension 32a of shaft 32 from motor 29.

FIGURE 2 and 3 illustrate, in a simplified manner the belt 10 of FIGURE 1 with its associated head and tail drive pulleys 12 and 14, respectively. These figures are intended to illustrate the operation of the invention in controlling belt tension as a load is carried along by the conveyor belt over a compound profile. To that end, the electric drive motors, gear trains, controllers, and the like, shown in FIGURE 1 have been omitted from FIGURES 2 and 3.

Turning then to FIGURES 2 and 3, and by way of example, the belt conveyor there shown may be considered as having a total distance from head to tail of 4500 feet. Of this total distance, 3240 feet is in the descending leg and 810 feet is in the ascending leg. The total drop in the descending leg 15 of the belt is 288 feet and the total rise in the ascending leg 17 is 102 feet, resulting in an overall drop of 186 feet.

Assuming, also, for example, that the material to be conveyed, designated A in FIGURES 1–3, weighs 100 pounds per cubic foot, that a belt speed of 300 feet per minute has been selected as the normal speed, that the belt normally travels 88% loaded, and that the other factors well known in the art apply, it can then be determined that such a belt will require an average estimated belt tension of 6000 pounds, and that when the belt is normally loaded (88%), a total negative horsepower of minus 50 (−50) will be needed. When the belt is loaded as illustrated in FIGURE 3, however, a total positive horsepower of plus 84 (+84) will be needed to maintain the proper belt tension. As indicated in the foregoing description, it is necessary that the drives selected, including the motors and the gearing be such that this horsepower is properly applied so that the proper tension is developed, and the use of very large counterweight systems is avoided.

According to the invention, a proper relationship of drives, including motor characteristics, is achieved when the desired belt tension is always maintained. Such a relationship of motors to their gearings and of the characteristics of the two motors employed is illustrated in the drawings, especially FIGURE 4.

FIGURE 4 is a representation of the motor characteristics of the head and tail drive motors according to the invention and shows their inter-relationship. According to the invention, and for purposes of illustration, the tail drive is provided with a 100 HP motor and the head drive with a 50 HP motor. The 100 HP motor has a 3% slip characterictic and the 50 HP motor has an 8% slip characteristic. Thus, the motors, as shown in FIGURE 4, do not have the same characteristic curves. The slope of the "curve" of the 100 HP motor is such that it does not vary as much in the output or regeneration for a given change in speed as does the 50 HP motor for the same change in speed.

The three load conditions given in connection with the discussion of the conveyor of FIGURES 1, 2 and 3, i.e., where minus 50 (−50), minus 109 (−109) and plus 84 (+84) HP are, respectively, required, are also illustrated in FIGURE 4. The chart of FIGURE 4 supplies the actual outputs of the motors.

The effect of the various load patterns and the manner in which the drives automatically adjust to load position can be readily appreciated by reference to FIGURE 4, as respects the conveyor system, including the drives, herein described.

The drives, i.e., gearing, pulley diameter, and motor characteristics, are, in the practice of this invention, so selected that the results depicted in FIGURE 4 are obtained with the conveyors of the types shown in FIGURES 1–3.

When the conveyor is loaded, as in FIGURE 1, it is operating, according to the illustrative example, at a selected speed of 300 feet per minute. The drives relate, and connect, the motors to the belt, and thus to each other so that the head motor is applying 25 HP to the belt while the tail motor is applying a resistance to the belt in the amount of minus 75 (−75) HP. This results in a minus 50 (−50) HP effect on the belt. The drives are resisting the tendency of the belt to overspeed the conveyor and, more importantly, the tendency of the descending load to affect the loss of belt tension particularly at the junction of the descending leg and the horizontal run of the conveyor.

When the load condition changes from that of FIGURE 1 to that of FIGURES 2 or 3, there is a change in the traction effort requirement as well as belt speed, and the factors affecting belt tension. When, as in FIGURE 1, during initial loading of an empty belt, the material is only on the downward slope, the maximum tendency of the load to create belt tension problems and to speed up the belt occurs. It is very important to consider the drive characteristics in this situation, and, in this instance, the motor characteristics, since the illustrative example relies on the motor characteristics as the main control element.

The conveyor, as loaded in FIGURE 2 (88% full load along its descending run), will speed up. The drive characteristics are such that when the belt speeds up, the HP output will reach plus 10 (+10) at the head end and minus 119 (−119) at the tail end with the belt stabilized, i.e., its speed controlled and its tension maintained. Thus, speed up will occur, of course, gradually as the load on the slope moves up to full load from zero. FIGURE 2 actually illustrates the maximum condition.

Eventually, the fully loaded condition of the entire belt will be reached, assuming the material is continuously placed on the tail end. As this occurs, the belt slows down and eventually reaches the −50 HP condition treated as the normal condition in the illustrative example.

If the loading of the belt with material should now stop long enough to permit the belt to reach the condition shown in FIGURE 3, then the maximum positive drive would obviously be necessary. As a matter of fact, it is also apparent that belt tension problems are very minimal when the load is entirely on the uphill slope. For the conveyor selected for illustration, including the drives selected, the speed will slow down until the head motor is applying +48 HP and the tail motor is supplying +36 HP to the belt. Thus resulting in a total positive application of +84 HP.

It is apparent that in all conditions from non-loaded to fully loaded, the belt speed will shift, and the effects of the drives on the belt shift therewith. Proper selection, as illustrated in the example, results in continuous control and also achieves the desired objectives.

It will also be obvious to those skilled in the art that the motors having the illustrated characteristics can be geared slightly differently to the conveyors to provide a different relationship between the torques of the two motors; i.e., the points shown on the chart, FIGURE 4, can be moved along the characteristic curves by changing the gearing. Thus, in effect, the characteristic curves are moved relative to one another. For example, if the gearing were changed on the tail drive, the characteristic curve on the chart 4 would move either to the left or right, depending on which way the gearing was changed, and, of course, both can be changed in equal or different amounts and the curves moved accordingly.

The net result of designing conveyor drives in accordance with the instant invention is as mentioned heretofore, the provision of a conveyor in which the tension in the belt carrying strand is controlled by the drives. The counterweight section 13 only provides a slack side tension for the head and drive pulley. The belt at the tail pulley is, in the instant case, also provided with sufficient tension to prevent slippage by the long length of the belt in the return run.

Figure 5:
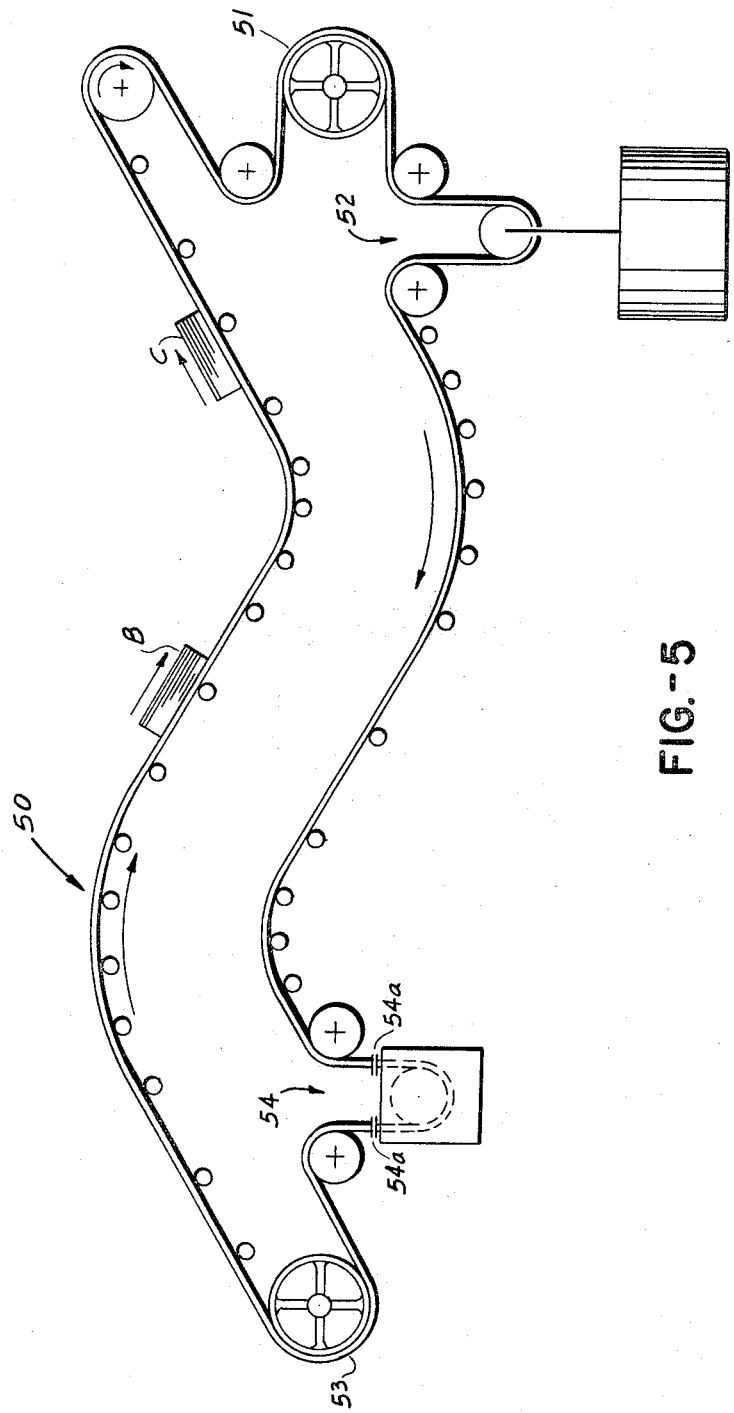
FIGURE 5 is a simplified elevational view of another compound conveyor loaded along two of its slopes and adapted to be driven in accordance with this invention.

In the embodiment of the invention depicted in FIGURE 5, the endless belt 50 of the conveyor system follows a modified path in its run between the head pulley 51 and the tail pulley 53, providing a downhill or decline section and a succeeding uphill or incline section along which loads B and C, respectively, are transported by the belt in the directions of the arrows. It will be understood that other elements of the head and tail drives, although not shown, are the same as are depicted in FIGURE 1, these having been omitted from FIGURE 5 in the interest of simplification.

The master counterweight take-up system 52 is supplemented by a "slave" counterweight take-up system 54 located adjacent the tail drive pulley 53 and it will be understood that this "slave" system is equally applicable to the conveyor system of FIGURE 1.

The function of the "slave" take-up system is to insure adequate and dependable traction and tensioning effort between the belt and the tail end pulley. Under normal operating conditions, the counterweight will be up against the stops, indicated generally at 54a. Unless this slack-side tension is provided, at least to a minimal degree, the belt will slip over the tail end pulley. The normal belt tension will be greater in amount than the weight of the take-up at 54 and the latter take-up will be raised during normal running. However, during starting the "slave" counterweight will provide tension at the tail. The main take-up system is usually located at some distance from the tail end of the belt, it is not immediately effective to take up slack upon starting or stopping of the conveyor. As the belt is stopped, the "slave" counterweight take-up will gradually restore itself to its initial rest position.

It will further be apparent, as heretofore indicated, that the drive characteristics, which are provided through the motor characteristics shown in FIGURE 4, can be obtained in other ways, and that the ratio of one drive output or change in output to the other can be varied. Thus, for example, the drives of FIGURE 1 may use different gear ratios for the two drives. Different pulley diameters and connections having different "slippage characteristics," such as a fluid or an eddy current coupling, can also change the ratios between the drives.

The head and tail drives are coupled to the belt and to each other through the belt. The belt, neglecting elastic properties, normally has the same linear speed at each drive. The drives, however, are "geared" or possess such "characteristics" as will permit them to operate at a different ratio with respect to the belt and with different effective effort. The same change in speed at one end thus produces a different effect at the other end. Accordingly, the following advantageous conditions or effects are obtained:

(1) When one motor operates at synchronous speed in the illustrated form, the other operates at above or below synchronous speed, i.e., absorbs or delivers power;

(2) Both drives may positively apply torque or subtract torque, and at different proportions of their rated powers, or one may subtract while the other is positively applying torque, i.e., the total output can be equal to the sum or the difference, of the effect of the two drives, depending upon conditions.

From what has been said heretofore, it will be understood that the drives are designed and so connected to the belt that with a change in belt speed, including a momentary tendency to change, there will be, at each drive, a resulting change in belt tension automatically effected between the two drives. The two drives are instantly sensitive to tendencies to speed changes and will automatically act to maintain a uniform tension and speed along the belt. The instant a speed change occurs the tractive effect, plus or minus, will alter to meet it.

Some of the advantages of using the instant principles have been set forth above. A principal advantage of this invention is that it makes possible a conveyor which will always be under control, without the use of heavy counterweights and heavy belts. It should also be apparent that the invention makes possible a conveyor having drives which are sensitive to speed changes, so that the relatively slight changes in speed will result in quick readjustment of the "inputs" of the drives. These and other advantages will be evident to those skilled in the art.

While I have shown and described preferred forms of the invention, it will be understood by those skilled in the art that many changes can be made and that, accordingly, I claim exclusive right to all modifications coming within the scope of the appended claims.

I claim:

1. A conveyor system which comprises a belt capable of being variably tensioned along its length and having a range of operating speeds, a head drive, a tail drive, and means drivingly connecting each of said drives to said belt, said drives having such different individual torque-speed characteristics and being connected to said belt by the respective said means such that the speed of said drives will vary as the speed of said belt varies and said drives will apply driving forces to the belt which will act in opposition to each other by a significant amount at least during a certain range of operating speeds of said belt, said characteristics of said drives and the connection of said drives to said belt by said means further being such that the tension in the belt between the two drives will be varied significantly due to variation in the amount of the respective opposing forces imposed on the belt by said drives as the forces applied to said belt by said drives vary in accordance with their respective said torque-speed characteristics during changes in the speed of said belt.

2. The conveyor of claim 1 wherein said drives comprise electric motors.

3. The conveyor of claim 2 wherein said electric motors each have a synchronous speed and one of said motors operates above its synchronous speed and the other below its synchronous speed while said belt is operating within said certain range of speeds.

References Cited

UNITED STATES PATENTS

| | | | |
|---|---|---|---|
| 2,326,098 | 8/1943 | Kimmich | 198—203 |
| 2,393,563 | 1/1946 | Petterson | 198—203 |
| 2,744,618 | 5/1956 | Seal | 198—203 |
| 3,191,743 | 6/1965 | Rissler et al. | 198—16 |

FOREIGN PATENTS

| | | |
|---|---|---|
| 892,704 | 4/1962 | Great Britain. |
| 921,781 | 3/1963 | Great Britain. |

EVON C. BLUNK, *Primary Examiner.*

R. J. HICKEY, *Assistant Examiner.*